United States Patent
Basit (10) Patent No.: US 10,632,624 B2
(45) Date of Patent: Apr. 28, 2020

(54) TOOL HOLDERS FOR ROBOTIC SYSTEMS HAVING COLLISION DETECTION

(71) Applicant: Illinois Tool Works Inc., Glenview, IL (US)

(72) Inventor: Nauman Basit, Windsor (CA)

(73) Assignee: Illinois Tool Works Inc., Glenview, IL (US)

( * ) Notice: Subject to any disclaimer, the term of this patent is extended or adjusted under 35 U.S.C. 154(b) by 310 days.

(21) Appl. No.: 15/219,591

(22) Filed: Jul. 26, 2016

(65) Prior Publication Data

US 2018/0029238 A1    Feb. 1, 2018

(51) Int. Cl.
| | |
|---|---|
| *B23K 9/10* | (2006.01) |
| *B23K 9/28* | (2006.01) |
| *B25J 13/08* | (2006.01) |
| *B25J 19/06* | (2006.01) |
| *B23K 9/32* | (2006.01) |
| *B23K 9/173* | (2006.01) |
| *B23K 37/00* | (2006.01) |

(52) U.S. Cl.
CPC ........... *B25J 13/085* (2013.01); *B23K 9/1006* (2013.01); *B23K 9/173* (2013.01); *B23K 9/321* (2013.01); *B23K 37/006* (2013.01); *B25J 19/063* (2013.01); *Y10S 901/09* (2013.01); *Y10S 901/42* (2013.01); *Y10S 901/46* (2013.01)

(58) Field of Classification Search
CPC ..... B25J 13/085; Y10S 901/00; Y10S 901/02; Y10S 901/09; Y10S 901/10; Y10S 901/027; Y10S 901/028; Y10S 901/30; Y10S 901/31–35; Y10S 901/36; Y10S 901/38; Y10S 901/41; Y10S 901/42
USPC .................................................. 219/136–144
See application file for complete search history.

(56) References Cited

U.S. PATENT DOCUMENTS

| | | | |
|---|---|---|---|
| 4,153,998 A | 5/1979 | McMurtry | |
| 4,514,616 A | 4/1985 | Warner | |
| 4,700,932 A | * 10/1987 | Katsuno | ................ B25J 19/063 188/266.2 |
| 4,998,606 A | 3/1991 | McCormick et al. | |

(Continued)

FOREIGN PATENT DOCUMENTS

EP         0764827         5/2005

OTHER PUBLICATIONS

Int'l Search Report and Written Opinion for Appln No. PCT/US2017/039890 dated Sep. 18, 2017 (16 pages).

*Primary Examiner* — Sang Y Paik
(74) *Attorney, Agent, or Firm* — McAndrews, Held & Malloy, Ltd.

(57) ABSTRACT

An example robotic tool holder includes an actuator that is disposed within a housing and configured to hold a tool. The housing and the actuator are in contact via dowels to limit movement of the actuator toward a distal end of the housing. Ones of the dowels that are in contact are in line contact and the ones of the dowels that are in contact are in a triangular geometry. The pressure plate is in line contact with the actuator within the housing around a circumference of the pressure plate. The springs are in contact with the pressure plate to bias the actuator toward a proximal end of the housing via the pressure plate. The springs are in contact with the mounting plate opposite the pressure plate. The sensor switch detects a shock force on the actuator and outputs a signal in response to the shock force.

20 Claims, 8 Drawing Sheets

(56) References Cited

U.S. PATENT DOCUMENTS

| | | | |
|---|---|---|---|
| 5,002,173 | A | 3/1991 | Hucul et al. |
| 5,146,691 | A | 9/1992 | McMurtry |
| 5,262,216 | A | 11/1993 | Popat et al. |
| 5,339,535 | A | 8/1994 | McMurtry et al. |
| 5,361,881 | A | 11/1994 | Simond |
| 5,505,005 | A | 4/1996 | McMurtry et al. |
| 5,585,021 | A | 12/1996 | Sperling et al. |
| 5,657,549 | A | 8/1997 | Shen et al. |
| 5,837,967 | A | 11/1998 | Sperling et al. |
| 5,839,557 | A | 11/1998 | McCormick |
| 5,915,506 | A | 6/1999 | Farina |
| 5,975,264 | A | 11/1999 | McCormick |
| 6,014,909 | A | 1/2000 | Fiora |
| 6,069,415 | A | 5/2000 | Little et al. |
| 6,214,057 | B1 | 4/2001 | Graham et al. |
| 6,335,510 | B1 | 1/2002 | Carbines |
| 6,346,751 | B1 | 2/2002 | Delfino et al. |
| 6,455,799 | B1 | 9/2002 | Forslund et al. |
| 7,002,102 | B2 | 2/2006 | Heinz-Martin et al. |
| 7,105,771 | B2 | 9/2006 | Inoue et al. |
| 7,849,761 | B2 | 12/2010 | Forslund et al. |
| 7,870,807 | B2 | 1/2011 | Hezel et al. |
| 9,339,937 | B2 | 5/2016 | Richtsfeld et al. |
| 2004/0175227 | A1 | 9/2004 | Munch et al. |
| 2013/0256291 | A1* | 10/2013 | Kondo ................. B23K 9/1735 219/138 |

\* cited by examiner

TOOL HOLDERS FOR ROBOTIC SYSTEMS HAVING COLLISION DETECTION

BACKGROUND

The invention relates generally to automated welding systems and, more particularly, to tool holders for robotic systems having collision detection.

SUMMARY

Tool holders for robotic systems having collision detection are disclosed, substantially as illustrated by and described in connection with at least one of the figures, as set forth more completely in the claims.

DETAILED DESCRIPTION

Automated welding can be performed using robots that hold welding torches are that are programmed to perform one or more welding operations. Robots have the benefit of providing highly repeatable, high quality welds. In some applications, robots are programmed to use very precise movements to perform a weld that has a very short arc length (e.g., a few millimeters). Repeatable precision movements may be achieved by depending on the movable components in the robot and/or the welding torch having a consistent reference position to which the program can return the robot. The robot may then use the reference position in the program, such as by implementing an inertial coordinate system having the reference position as a designated point in the coordinate system.

Shock sensors (also referred to as collision detectors) regulate the positional accuracy of a tool with respect to an inertial coordinate system. In the welding context, a welding torch is mounted to an actuator of a shock sensor and a housing is rigidly mounted to the robot. In the event of a shock or impact, the actuator moves from its rest position or Tool Center Point (TCP) which triggers a normally closed switch to open and signal the robot controller to stop. The welding gun is required to return to the TCP in an accurate and precise manner. A TCP error is magnified at the contact tip and results in degradation of weld quality (e.g., due to inconsistent welding arc lengths), requiring re-programming.

As described in more detail below, disclosed tool holders include features that reduce friction forces that reduce the positional accuracy and/or reliability of conventional tool holders.

As used herein, "line contact" is defined as contact substantially along a single line, accounting for deformation along the line of contact. As used herein, "line contact" also includes point contact, or contact at a single point (e.g., between two round surfaces), accounting for deformation at the point of contact.

Disclosed example robotic tool holders include a housing, an actuator, a pressure plate, springs, a mounting plate, and a sensor switch. The housing has a proximal end and a distal end. The actuator is disposed within the housing and configured to hold a tool, the housing and the actuator being in contact via a plurality of dowels to limit movement of the actuator toward the distal end of the housing. In disclosed examples, ones of the plurality of dowels that are in contact are in line contact and the ones of the plurality of dowels that are in contact are in a triangular geometry. The pressure plate is in line contact with the actuator within the housing around a circumference of the pressure plate. The springs are in contact with the pressure plate to bias the actuator toward the proximal end of the housing via the pressure plate. The mounting plate couples the robotic tool holder to a robot, and the springs are in contact with the mounting plate opposite the pressure plate. The sensor switch detects a shock force on the actuator and to output a signal in response to detecting the shock force.

In some examples, the actuator is configured to hold a welding torch such that shock force applied to the welding torch is transferred to the actuator. In some example robot tool holders, the actuator and the pressure plate are configured to transfer at least a portion of the shock force to the plurality of springs. In some examples, the sensor switch is in communication with a robot control system configured to control the robotic tool holder to move to a predetermined position in response to the sensor switch signal.

In some example robotic tool holders, the triangular geometry of contacting ones of the dowels is configured to endure acceleration of the robotic tool holder up to at least a selected acceleration without causing the sensor switch to falsely detect the shock force, where the triangular geometry includes diameters of the dowels and a space between at least two of the dowels in the triangular geometry. In some examples, the dowels include three sets of dowels spaced around an inner circumference of the housing and the outer circumference of the actuator. In some such examples, each of the three sets of the dowels includes two dowels attached to the housing and one dowel attached to the actuator. In some examples, each of the three sets of the dowels includes two dowels attached to the actuator and one dowel attached to the housing.

In some examples, the housing, the actuator, the pressure plate, the mounting plate, and the sensor switch have coaxial interior spaces to permit a cable to traverse through the robotic tool holder to a weld torch coupled to the actuator. In some examples, the springs exert a spring force on the pressure plate that is greater than a total of a first friction force between the pressure plate and the actuator along the line contact and a second friction force between ones of the dowels attached to the actuator and corresponding ones of the dowels attached to the housing.

In some example robotic tool holders, the dowels include two or more sets of dowels spaced around an inner circumference of the housing and the outer circumference of the actuator, where each set of dowels includes two dowels attached to one of the housing or the actuator, and one dowel attached to the other of the housing or the actuator. In some examples, the dowels include Stainless Steel Alloy 416 or titanium.

In some examples, the springs are die springs, and the mounting plate and the pressure plate include cavities to retain the plurality of springs. In some such examples, the mounting plate and the pressure plate are configured to retain the plurality of springs parallel to a centerline of the housing. In some examples, the cavities in the pressure plate are tapered to reduce deflection of the plurality of springs when the pressure plate is tilted within the housing.

In some examples, an end of the actuator that is in contact with the pressure plate has a curved surface around a circumference of the actuator such that the actuator and the pressure plate form a ball-and-socket-type joint. In some such examples, the line contact changes with respect to the pressure plate when force is transferred by the actuator, and the actuator and the pressure plate are configured to tilt with respect to the housing based on a direction of the shock force. In some examples, an outer edge of the pressure plate is rounded to permit the pressure plate to rotate within the housing. In some examples, the dowels include three sets of dowels spaced around an outer circumference of the housing and an inner circumference of the actuator.

Disclosed example robotic welding systems are capable of detecting impacts to a welding torch manipulated by a robot, and include a robot arm, a welding torch, a welding torch holder, and a robot controller. The robot arm is configured to move a welding end of the robot arm. The welding torch holder includes a housing, an actuator, a pressure plate, springs, a mounting plate, and a sensor switch. The housing has a proximal end and a distal end. The actuator is disposed within the housing to hold the welding torch, where the housing and the actuator are in contact via a plurality of dowels to limit movement of the actuator toward the distal end of the cylindrical housing. Ones of the plurality of dowels that are in contact are in line contact and the ones of the plurality of dowels that are in contact are in a triangular geometry. The pressure plate is in line contact with the actuator within the housing around a circumference of the pressure plate. The springs are in contact with the pressure plate to bias the actuator toward the proximal end of the housing via the pressure plate. The mounting plate couples the welding torch holder to a robot. The plurality of springs are in contact with the mount opposite the pressure plate. The sensor switch detects a shock force on the actuator and outputs a signal in response to detecting the shock force. The robot controller receives the signal as an input and, in response to receiving the signal, controls the robot arm to assume a preset position.

Figure 1:
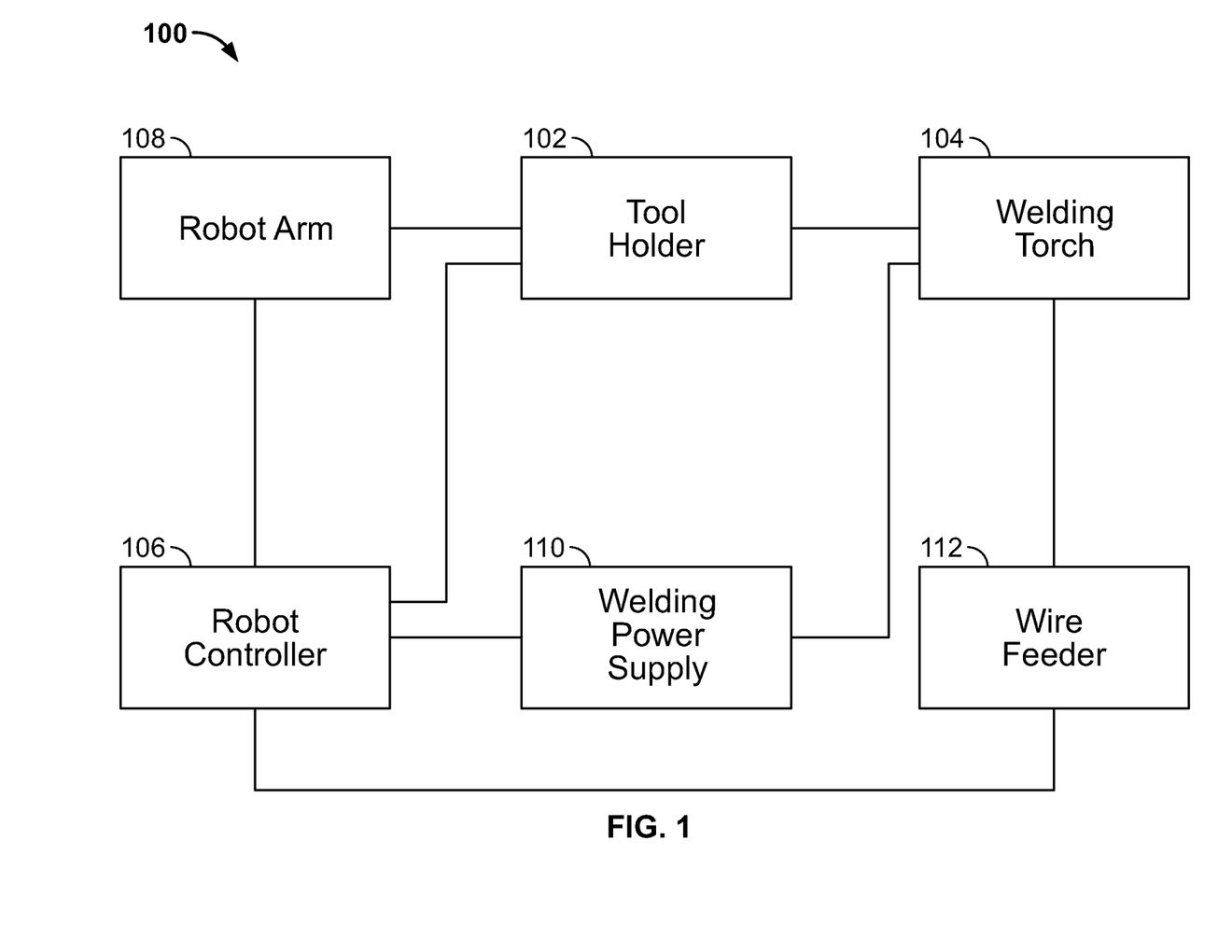
FIG. 1 is a block diagram illustrating an example robotic system having collision detection and including a tool holder in accordance with aspects of this disclosure.

FIG. 1 is a block diagram illustrating an example robotic system 100 having collision detection and including a tool holder 102. The example robotic system 100 and the tool holder 102 of FIG. 1 are configured to perform automated (e.g., programmatic) welding using a welding torch 104 held by the tool holder 102. The example robotic system 100 includes a robot controller 106 that controls the movement and/or orientation of a robot arm 108, where the welding torch 104 is attached to the robot arm 108 via the tool holder 102. To perform welding, the example robotic system 100 includes or is provided with a welding power supply 110 to provide welding-type power to the welding torch 104 and/or a wire feeder 112 to provide welding wire to the welding torch 104.

The robot controller 106 controls the robot arm 108 to perform programmed movements using one or more joints of the robot arm 108. The robot controller 106 may reference the movements from a reference orientation of the robot arm 108, which also includes a reference orientation of the tool holder 102 and the welding torch 104. When the robot arm 108, the tool holder 102, and the welding torch 104 are in the reference position (e.g., within an acceptable margin of error, which may be very small), the robot controller 106 can be confident that commanded movement of the robot arm 108 translates into desired positions of the welding torch 104.

Collisions between the welding torch 104 and another object can cause the welding torch 104 to be out of the position from the position commanded by the robot controller 106. Thus, in response to detecting a collision, the robot controller 106 returns the robot arm 108, the tool holder 102, and the welding torch 104 to the reference position to reestablish positional accuracy. As described in more detail below, the example tool holder 102 includes a collision detection system that detects collisions or shock forces at the welding torch 104, absorbs at least a portion of the shock force on the welding torch 104, and/or communicates the collision event to the robot controller 106 to take corrective action.

Figure 2:
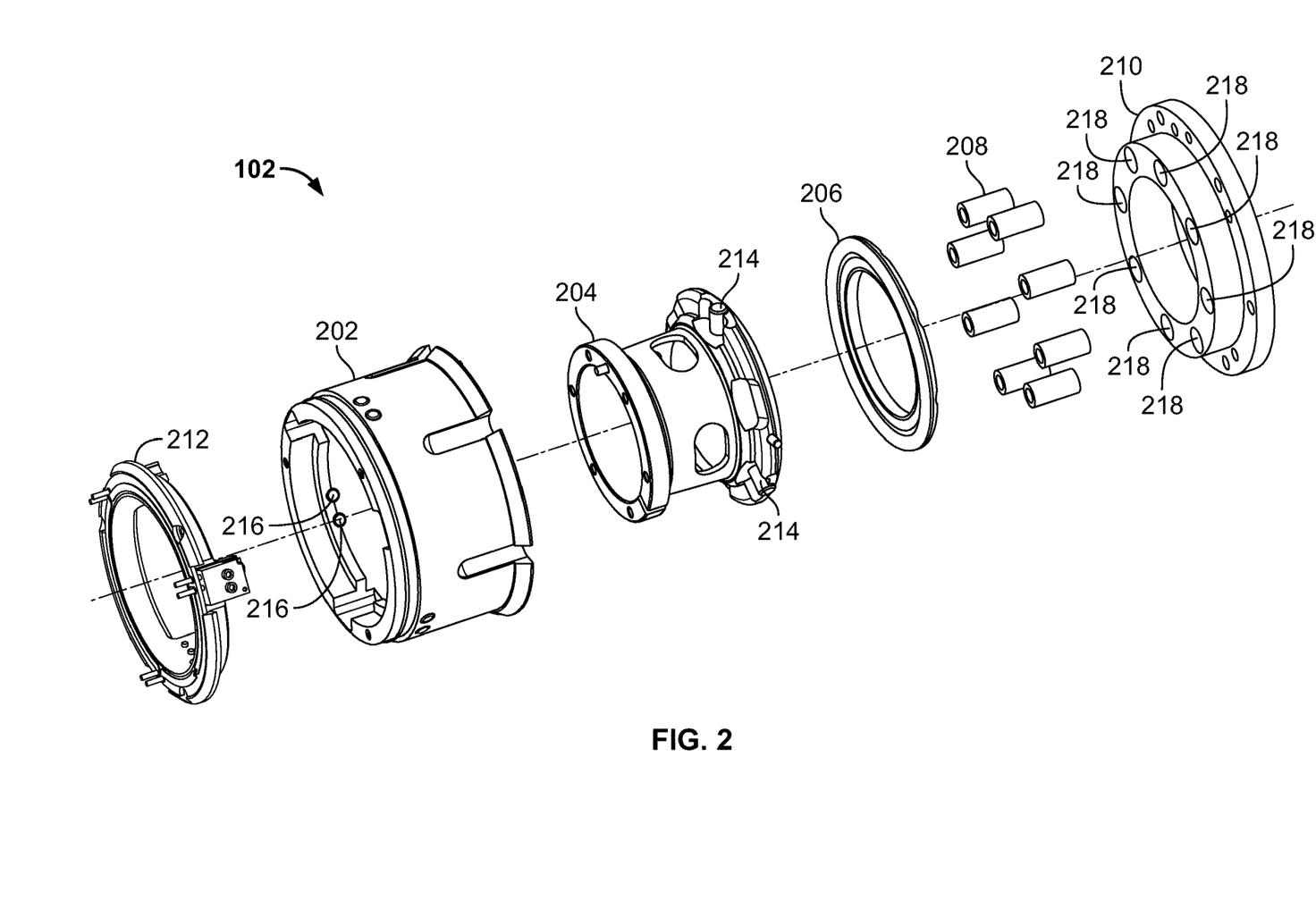
FIG. 2 is an exploded view of an example implementation of the tool holder of FIG. 1.
Figure 3:
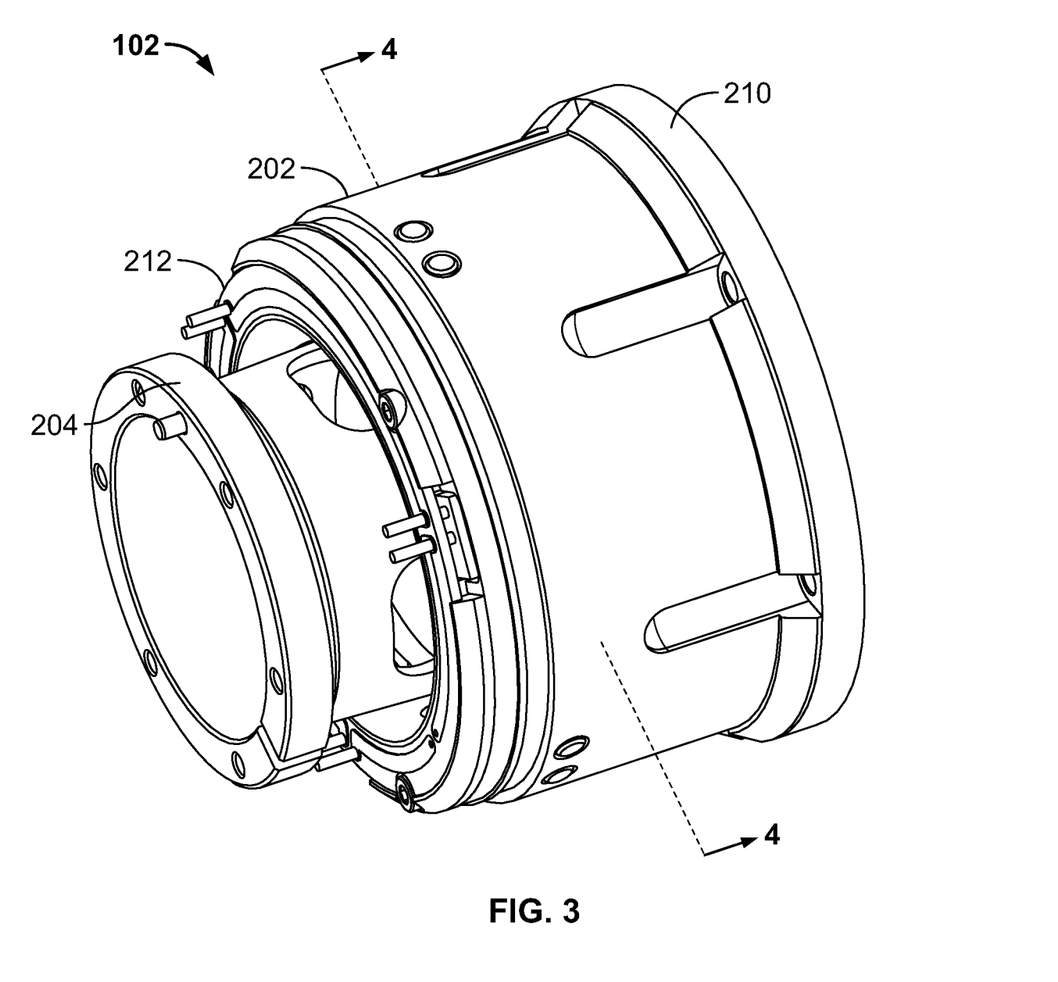
FIG. 3 is an assembled view of the example tool holder of FIG. 2.

FIG. 2 is an exploded view of an example implementation of the tool holder 102 of FIG. 1. The example tool holder 102 includes a housing 202, an actuator 204, a pressure plate 206, springs 208, a mounting plate 210, and a sensor switch 212. FIG. 3 is an assembled view of the example tool holder 102 of FIG. 2.

The example actuator 204 is disposed within the housing 202. The actuator 204 is configured to hold a tool, such as the welding torch 104. The housing 202 and the actuator 204 are in contact via sets of dowels (e.g., actuator dowel 214, housing dowels 216) that limit movement of the actuator 204 with respect to the housing 202. For example, one or more dowel(s) of the actuator 204 may abut one or more opposing dowel(s) of the housing 202. To reduce friction between the dowels that may prevent the tool holder 102 from returning to the tool center point, respective ones of the dowels 214, 216 that are in contact are in a line contact and/or point contact and, in some examples, each set of dowels 214, 216 are in a triangular geometry. Example dowel arrangements are described in more detail below with reference to FIGS. 4 and 5.

The example pressure plate 206 of FIG. 2 is in a line contact with the actuator 204 within the housing 202 around a circumference of the pressure plate 206. In particular, the end of the actuator 204 that is in contact with the pressure plate 206 has a curved surface around a circumference of the actuator 204, such that the actuator 204 and the pressure plate 206 form a ball-and-socket-type joint. That is, the actuator 204 may rotate within the pressure plate 206. As the actuator 204 and the pressure plate 206 rotate, the pressure plate 206 remains in a line contact with the actuator 204 and the contact line may shift along the end of the actuator 204 and the pressure plate 206. However, the springs 208 and the housing 202 restrict the rotation of the pressure plate 206 with respect to the housing 202.

The springs 208 are in contact with the pressure plate 206 to bias the actuator 204 into contact with (e.g., toward the tool end of) the housing 202 via the pressure plate 206. The springs 208 are industrial heavy-duty die springs. In combination with the springs 208, the pressure plate 206 extends the life of the tool holder 102 relative to conventional tool holders. The mounting plate 210 couples the robotic tool holder 102 to the robot arm 108. The springs 208 are in contact with the mounting plate 210 opposite the pressure plate 206. The springs 208 are arranged around a circumference of the pressure plate 206 and the mounting plate 210. The example mounting plate 210 includes cavities 218 to retain the springs 208 in position.

In the example of FIG. 2, the springs 208 are die springs and the cavities 218 are deep enough to prevent substantial deflection of the springs 208. The example pressure plate 206 likewise includes cavities 220 that retain the springs 208. The cavities 220 in the pressure plate 206 are shallower than the cavities 218, and are tapered toward the outer circumference of the pressure plate 206 to reduce or prevent deflection of the springs 208 when the pressure plate 206 is tilted away from the tool center point (e.g., in response to a shock force).

The actuator 204 holds welding torch 104 such that shock force applied to the welding torch 104 is transferred to the actuator 204. The actuator 204 further transfers the shock force to the pressure plate 206 and to one or more of the springs 208. The actuator 204 and the pressure plate 206 may be tilted out of alignment with the tool center point in response to the shock force (e.g., based on a direction of a collision), and transfer the shock force to corresponding ones of the springs 208.

The example sensor switch 212 detects shock force on the actuator 204 and outputs a signal in response to detecting the shock force. For example, the sensor switch 212 may implement a normally closed circuit which also includes the dowels 214, 216. When any of the dowels break contact (e.g., in response to a shock that moves the actuator 204), the circuit is opened and the sensor switch 212 generates and transmits a collision signal (e.g., to the robot controller 106 of FIG. 1). The collision signal causes the robot controller 106 to cease movement of the robot arm 108 to reduce the likelihood of damage to the welding torch 104.

Figure 4:
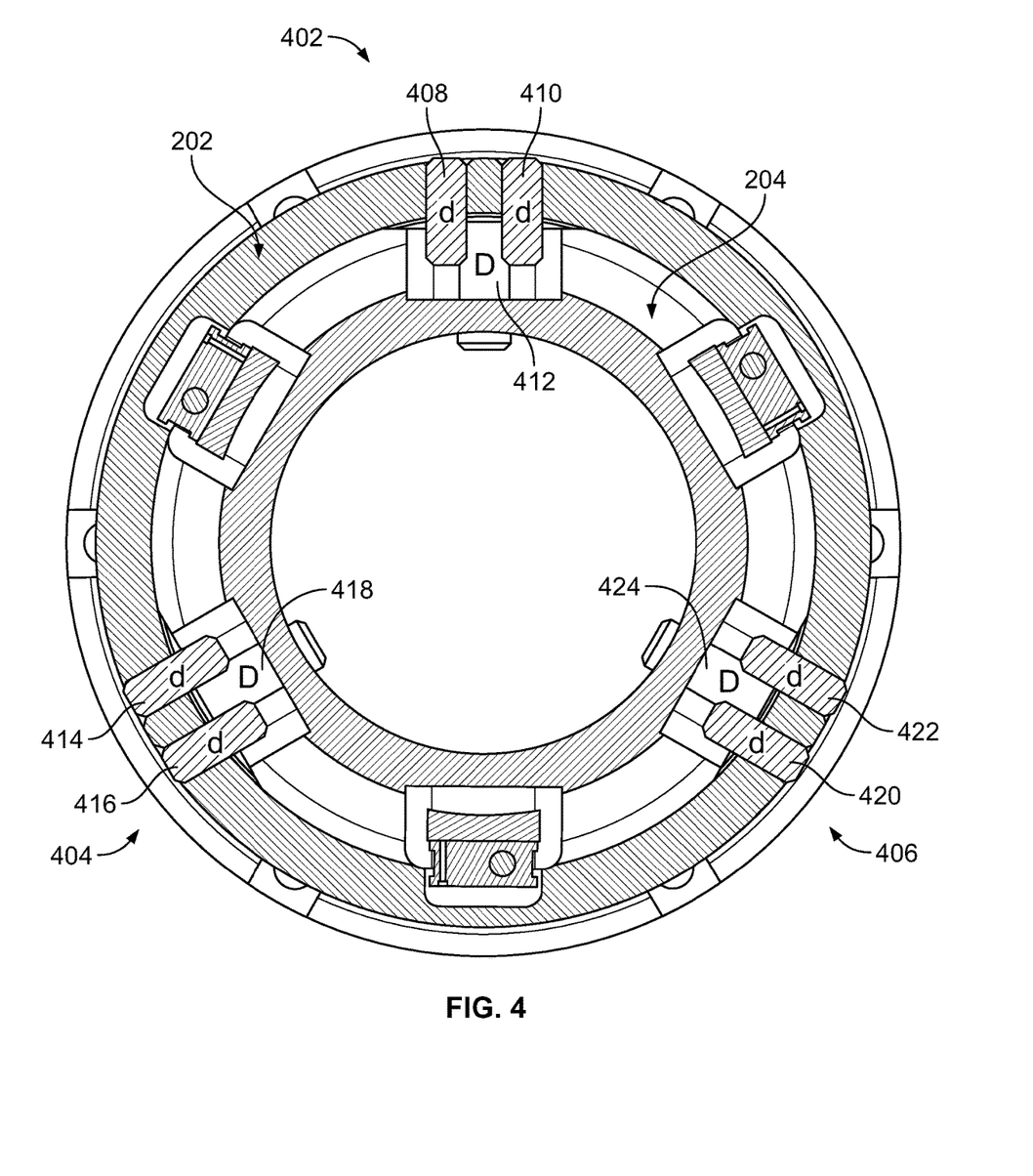
FIG. 4 illustrates a cross-section of an actuator and a housing of the example tool holder of FIGS. 2 and 3.

FIG. 4 illustrates a cross-section of the actuator 204 and the housing 202 of the example tool holder 102 of FIGS. 2 and 3. Sets of dowels, indicated using reference numerals 402, 404, and 406, are shown in FIG. 4. The example tool holder 102 includes three sets of dowels 402, 404, 406 spaced around an inner circumference of the housing 202 and the outer circumference of the actuator 204. However, the tool holder 102 may use fewer sets or more sets of dowels than the three sets shown in FIG. 4. Additionally or alternatively, the actuator 204 may be located on an exterior of the housing 202 such that the sets of dowels 402, 404, 406 are spaced around an outer circumference of the housing 202 and an inner circumference of the actuator 204. The sets of dowels 402-406 function as an alignment mechanism to easily align the housing 202 and the actuator 204. The example sets of dowels 402-406 may be evenly or unevenly spaced around the housing 202 and the actuator 204.

Figure 5:
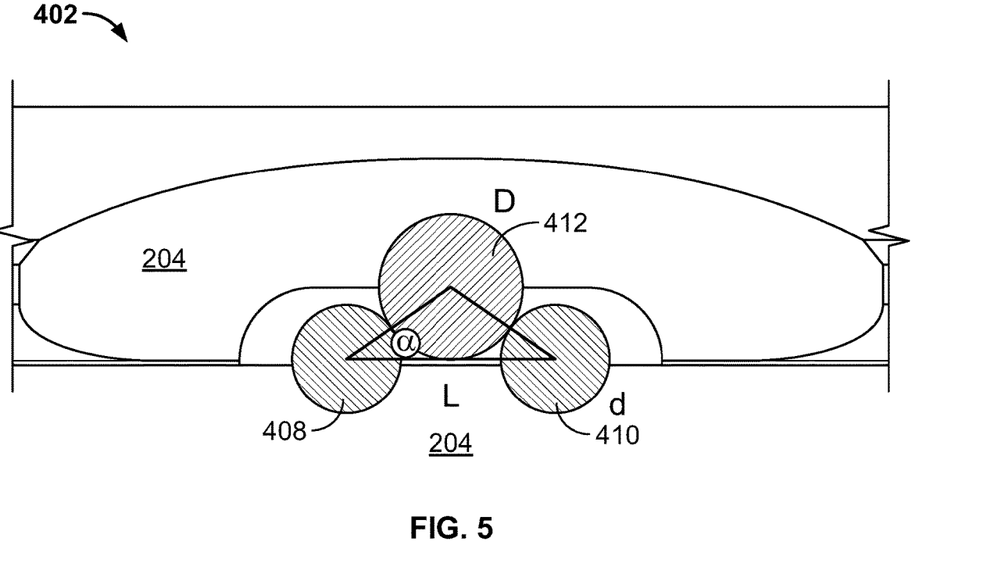
FIG. 5 illustrates a cross section of an example set of dowels in line contact.

The set of dowels 402 includes two dowels 408, 410 attached to the housing 202 and a dowel 412 attached to the actuator 204. The set of dowels 404 includes two dowels 414, 416 attached to the housing 202 and a dowel 418 attached to the actuator 204. The set of dowels 406 includes two dowels 420, 422 attached to the housing 202 and a dowel 424 attached to the actuator 204. The example dowels 408, 410, 414, 416, 420, 422 each have a first diameter d, and the example dowels 412, 418, 424 each have a second diameter D. FIG. 5 illustrates a cross section of the set of dowels 402 in line contact. As illustrated in FIG. 5, when the dowels 408-412 are in contact, the dowels 408-412 have a triangular geometry. The diameters D and/or d, the angular geometry (e.g., the angle α shown in FIG. 5), and/or the spacing between the dowels 408, 410 may be adjusted based on, for example, a number of sets of dowels on the device.

Conventional alignment systems use the face of an actuator-type device to create a cylindrical cavity which aligns with a dowel on the housing. Due to imperfections in the surface profile of the cavity, differences in material(s), surface finish(es), and/or hardness differences between the actuator cavity and the housing dowels, the sliding friction force between these surfaces is much higher. The dowel sets 402, 404, 406 of disclosed examples are arranged such that two dowels (e.g., 408, 410) on the housing 202 align with one dowel (e.g., 412) on the actuator 204. The dowel arrangement of the disclosed examples reduces the friction force $F_1$ significantly compared to conventional dowel systems, and improves the accuracy and repeatability of the tool positioning.

The example of FIGS. 2-8 alignment mechanism works with three sets of dowels. Each set includes one dowel on the actuator 204 and two dowels on the housing 202. In some examples, the two dowels 408, 410 per set are attached to or part of the actuator 204, and the single dowel 412 is attached to or part of the housing 202. Each actuator dowel 412, 418, 424 forms line contacts with the corresponding pair of dowels 408, 410, 414, 416, 420, 422 on the housing 202, with one line contact between the actuator dowel 412, 418, 424 and each of the corresponding housing dowels (e.g., dowel 412 has one line contact with dowel 408 and one line contact with dowel 410). The line contacts substantially reduce the friction as compared to the surface contact in conventional designs. Furthermore, the dowels 408-424 on the actuator 204 and the housing 202 are made from the same material, the same surface finish, and/or the same hardness specifications to reduce (e.g., minimize) wear and to maintain accuracy and repeatability of the alignment mechanism. An example material is steel alloy 416, which has a high machinability and enables a high surface finish. Steel alloy 416 can be tempered or hardened to achieve a desired surface hardness. The corrosion resistance property of steel alloy 416 ensures that the dowel surfaces will retain the hardness and finish properties, and enables the shock sensor to be used with water cooled robotic welding guns and in high humidity industrial applications. Other example materials that may be used to implement the dowels 408-424 include titanium, martensitic stainless steels and titanium, and precipitation-hardened stainless steels and titanium.

The diameters D, d of the dowels 408-424 and the distance between the dowels 408-424 on the housing affect the stability and accuracy of the system. For example, the alignment mechanism is required to operate above a threshold limit for acceleration and vibration so that the sensor switch 212 does not provide false feedback during high acceleration moves. The diameters "D" and "d" are selected based on the annular space available for the alignment mechanism between the housing 202 and the actuator 204 and the strength required to withstand a collision or impact. Dimensional variables d, D and l in the triangle shaped geometry illustrated in FIG. 5 formed with each set of three dowels are selected to achieve stability of the tool holder 102 and accuracy and repeatability of the positioning of the tool holder 102 and of the welding torch 104.

As illustrated in FIGS. 2, 3, and 4, the housing 202, the actuator 204, the pressure plate 206, the mounting plate 210, and the sensor switch 212 have coaxial interior spaces to permit a cable to traverse through the tool holder 102 to the weld torch 104 coupled to the actuator 204.

Figure 6:
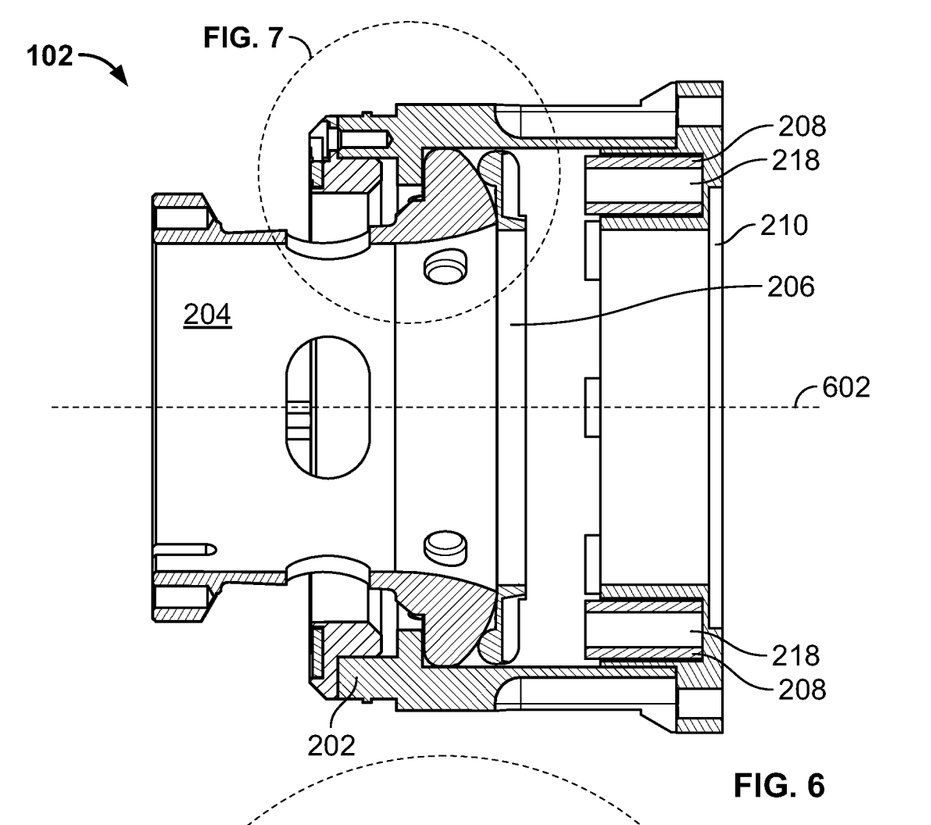
FIG. 6 illustrates a cross section of the example tool holder of FIG. 4.

FIG. 6 illustrates a cross section of the example tool holder 102 of FIG. 4. As shown in FIG. 6, the actuator 204 and the pressure plate 206 are aligned along a tool center point 602. When aligned at the tool center point, the welding torch 104 can be accurately positioned at the reference position by the robot controller 106.

Figure 7:
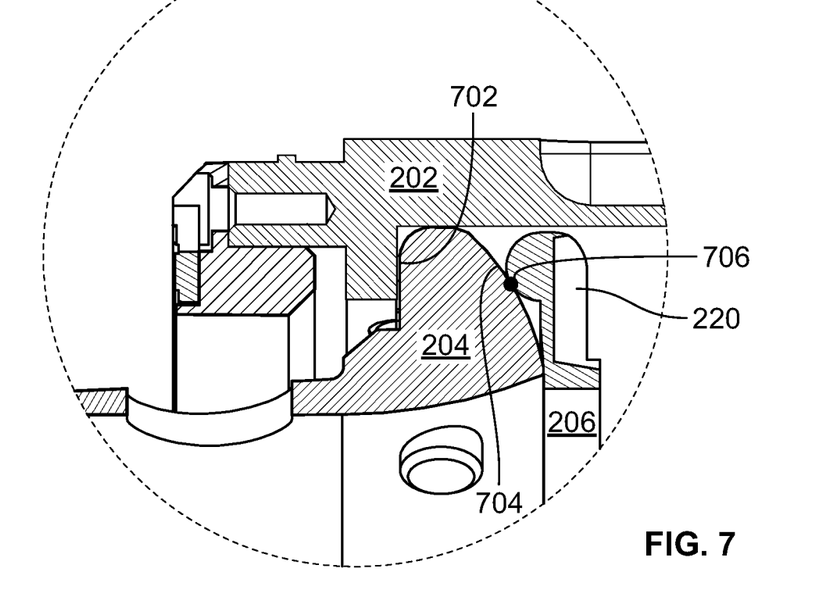
FIG. 7 is a more detailed view of the interfaces between the actuator, the housing, and the pressure plate of FIG. 6.

FIG. 7 is a more detailed view of the interfaces between the actuator 204, the housing 202, and the pressure plate 206 of FIG. 6. As shown in FIG. 7, the actuator 204 includes a flange 702 that seats against the housing 202. The actuator 204 also has a rounded edge 704 that interfaces with a rounded surface 706 of the pressure plate 206 as a ball-and-socket-type joint.

FIG. 7 also illustrates a cross-section of the contact line 708 between the rounded edge 704 of the actuator 204 and the rounded surface 706 of the pressure plate 206. As the rounded edge 704 of the actuator 204 shifts in and/or around the rounded surface 706, the contact line 708 may also change position with respect to the rounded edge 704 and/or the rounded surface 706. The rounded surface 706 of the pressure plate 206 extends to the edges of the pressure plate 206 (e.g., at the interface between the pressure plate 206 and the housing 202) to enable the pressure plate 206 to rotate within the housing 202 without jamming or sticking.

Figure 8:
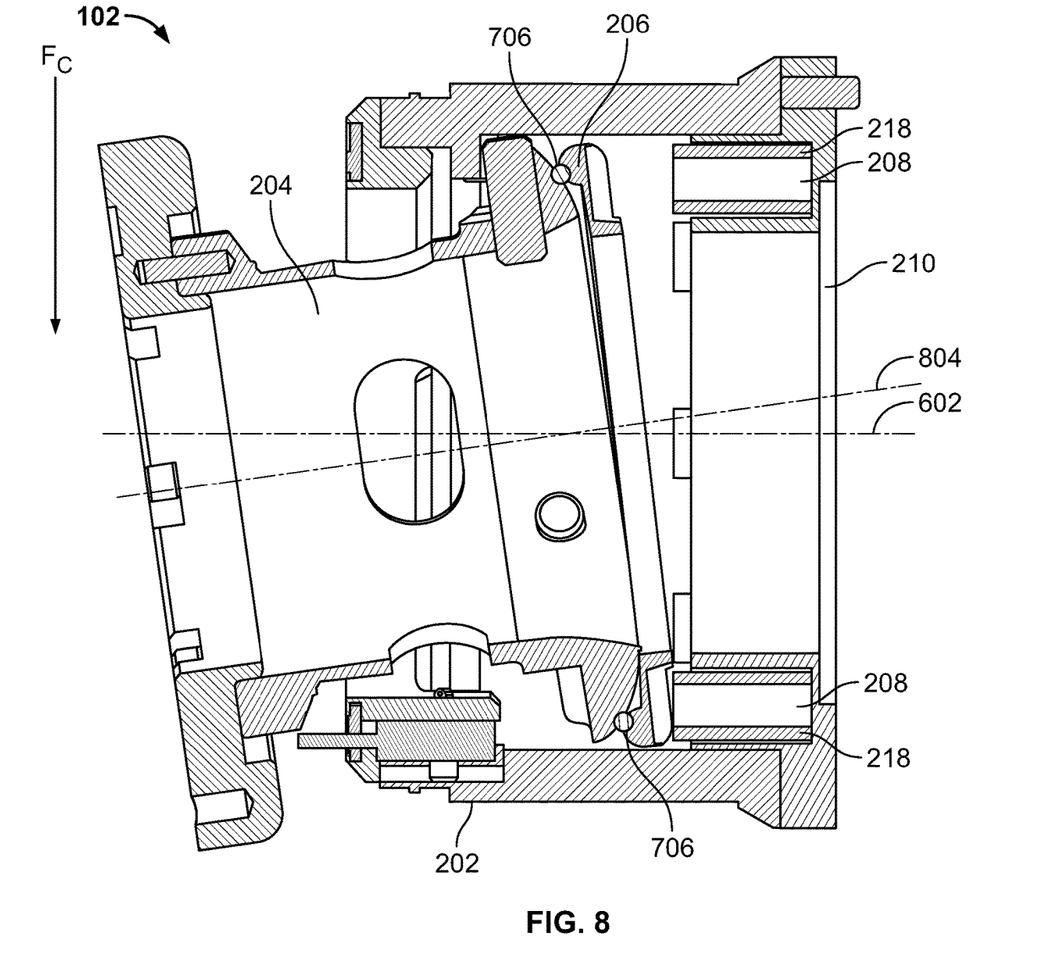
FIG. 8 is a cross-section view of the example tool holder of FIGS. 2 and 3 illustrating responses of the actuator and the pressure plate to a shock applied to the tool holder such as by a collision involving the tool.

FIG. 8 is a cross-section view of the example tool holder 102 of FIGS. 2 and 3 illustrating responses of the actuator 204 and the pressure plate 206 to a shock applied to the tool holder 102 such as by a collision involving a welding torch attached to the actuator 204. A force vector Fc is illustrated in FIG. 8 to show a direction of the force causing the displacement of the actuator 204. As the center line 802 of the actuator 204 diverges from the tool center point 602, the following occurs: 1) one or more of the dowels of the actuator 204 (e.g., the dowels 412, 418, 424) are disengaged from their opposing dowels attached to the housing 202; 2) a portion of the actuator 204 is forced further into the housing 202, pushing on the pressure plate 206 in an asymmetrical manner; 3) the pressure plate 206 is pushed toward the mounting plate 210, while the springs 208 resist the movement of the pressure plate 206 and attempt to maintain the pressure plate 206 in line with the tool center point 602; 4) because the actuator 204 is being forced out of alignment with the tool center point 602 and the springs 208 are urging the pressure plate into alignment with the tool center point 602, the actuator 204 rotates within the rounded curved surface 706 of the pressure plate 206 (e.g., as a ball-and-socket-type joint); and 5) the line contact 706 between the rounded edge 704 of the actuator 204 and the rounded surface 706 of the pressure plate 206 changes from the initial line contact location shown in FIG. 7 as the actuator 204 rotates with respect to the pressure plate 206.

When the actuator 204 is moved such that fewer than all of the dowel sets are in contact, the sensor switch 212 transmits the signal (e.g., to the robot controller 106). In response, the robot controller 106 stops any movement of the robot arm 108 and tool holder 102, and returns the robot arm 108 and the tool holder 102 (and the welding torch 104) to the reference position. The return of the robot arm 108 and the tool holder 102 to the reference position eliminates the forces on the actuator 204, enabling the actuator 204 and the pressure plate 206 to be urged into alignment with the tool center point 602.

Figure 9:
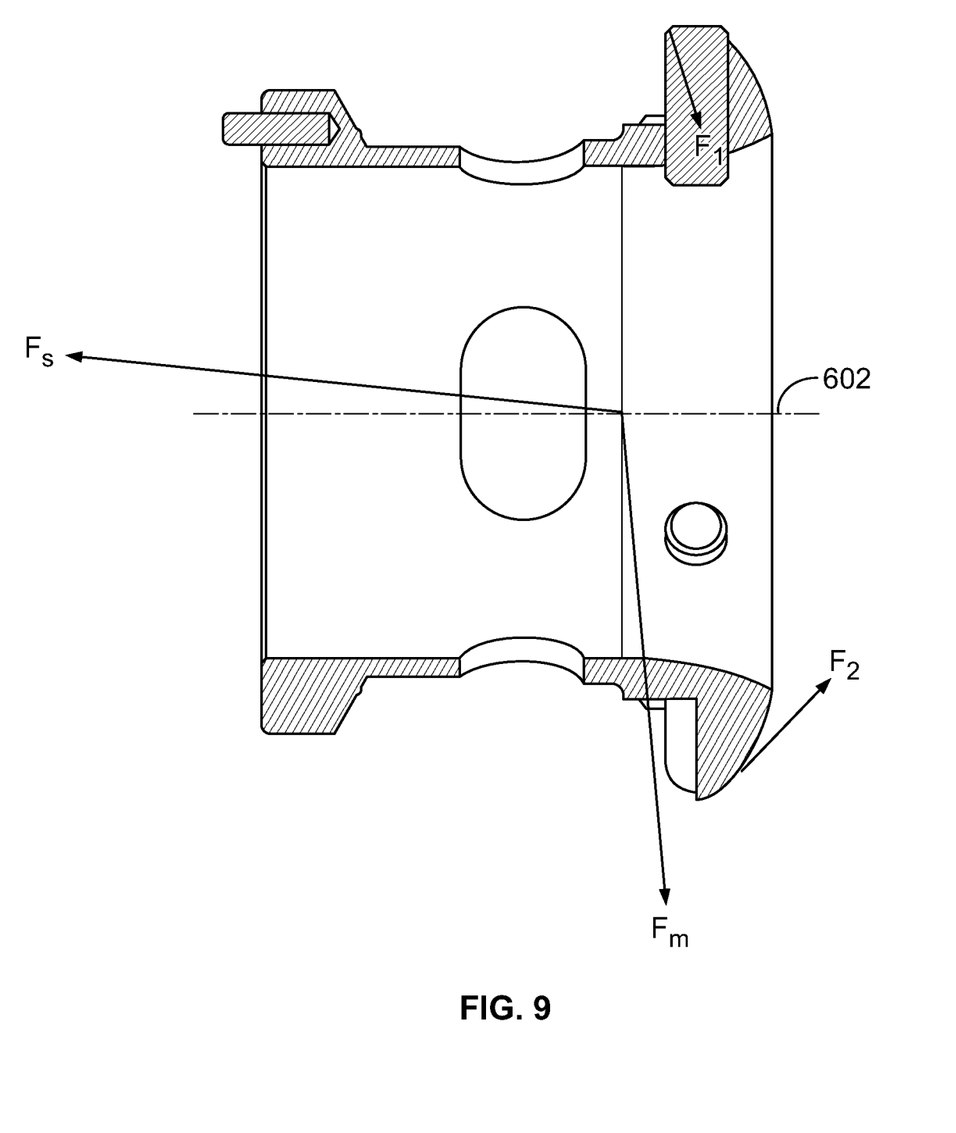
FIG. 9 is a cross section view of the example actuator illustrating example force vectors that may affect the actuator when returning to a reference position.

FIG. 9 is a cross section view of the example actuator 204 illustrating example force vectors $F_s$, $F_m$, $F_1$, $F_2$ that may affect the actuator 204 when returning to a reference position. $F_s$ is the spring force applied by the springs 208 to the pressure plate 206 and the actuator 204. The spring force ($F_s$) has to overcome three primary forces: 1) resulting force due to the mass of the welding gun ($F_m$), 2) friction force ($F_1$) at the interface between the dowels, and 3) friction force ($F_2$) at the point of application of the spring force $F_s$ on the actuator 204 (e.g., friction in the ball-and-socket-type joint between the actuator 204 and the pressure plate 206).

As the actuator 204 returns to alignment with the tool center point position 602, the spring force Fs approaches a lower spring force limit. However, to reliably and accurately return the tool holder 102 to the tool center point 602, in the example of FIGS. 2-8 the lower limit of the spring force Fs is greater than the sum of the forces $F_m$, $F_1$, and $F_2$ (e.g., Fs>$F_m$+$F_1$+$F_2$). In contrast with conventional tool holders, the examples of FIGS. 2-8 reduce the friction forces F1 and F2 as described in more detail below to improve the reliability and accuracy of positioning the tool holder 102.

Conventional tool holders use opposing surfaces of an actuator-like device and a pressure plate-like device to apply spring forces to the actuator-like device. The surface contact results in a higher frictional force, which hinders the return of conventional tool holder to the tool center point and reduces the reliability and/or accuracy of the positioning of the tool holder and/or the welding torch at the reference position. Some conventional tool holders use customized wave springs, which occupy less space than die springs and do not use a pressure plate to transfer the spring force to the actuator due to an ability to flex laterally. However, wave springs are not designed for high number of cycles and the spring force reduces significantly over time.

Disclosed examples have a line contact between the pressure plate 206 and the actuator 204 instead of a surface contact. Relative to a surface contact, the line contact reduces the magnitude of the resulting frictional force $F_2$. Disclosed examples also use die springs, which have a longer operational life and a more consistent spring force over time, ensuring long-term accuracy and reliability of the tool positioning.

The example tool holder 102 includes an interior cavity to permit one or more cables (e.g., a power cable, air-cooling and/or water-cooling cables, wire brake hoses, airblast hoses, inert gas supply hoses, electrode liners, etc.) to be fed through the center of the tool holder 102 from the welding power supply 110 and/or the robot arm 108 to the welding torch 104. The expanded interior cavity of the actuator 204 creates a bell-shaped cavity that reduces damage to cable(s) caused by rotation of the actuator 204 during impact.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A robotic tool holder, comprising:
a housing having a proximal end and a distal end;

an actuator disposed within the housing and configured to hold a tool, the housing and the actuator being in contact via a plurality of dowels to limit movement of the actuator toward the distal end of the housing, in which ones of the plurality of dowels that are in contact are in line contact and the ones of the plurality of dowels that are in contact are in a triangular geometry, wherein the plurality of dowels comprises one or more sets of dowels, each set of dowels comprising two dowels attached to one of the housing or the actuator, and one dowel attached to the other of the housing or the actuator;

a pressure plate in line contact with the actuator within the housing around a circumference of the pressure plate;

a plurality of springs in contact with the pressure plate to bias the actuator toward the proximal end of the housing via the pressure plate;

a mounting plate to couple the robotic tool holder to a robot, the plurality of springs in contact with the mounting plate opposite the pressure plate; and a sensor switch to detect a shock force on the actuator and to output a signal in response to detecting the shock force.

2. The robotic tool holder as defined in claim 1, wherein the actuator is configured to hold a welding torch such that the shock force applied to the welding torch is transferred to the actuator.

3. The robotic tool holder as defined in claim 1, wherein the actuator and the pressure plate are configured to transfer at least a portion of the shock force to the plurality of springs.

4. The robotic tool holder as defined in claim 1, where the sensor switch is in communication with a robot control system configured to control the robotic tool holder to move to a predetermined position in response to the sensor switch signal.

5. The robotic tool holder as defined in claim 1, wherein the triangular geometry of contacting ones of the dowels is configured to endure acceleration of the robotic tool holder up to at least a selected acceleration without causing the sensor switch to falsely detect the shock force, the triangular geometry including diameters of the dowels and a space between at least two of the dowels in the triangular geometry.

6. The robotic tool holder as defined in claim 1, wherein the dowels comprise three sets of dowels spaced around an inner circumference of the housing and an outer circumference of the actuator.

7. The robotic tool holder as defined in claim 6, wherein each of the three sets of the dowels comprises either two dowels attached to the housing and one dowel attached to the actuator or two dowels attached to the actuator and one dowel attached to the housing.

8. The robotic tool holder as defined in claim 1, wherein the housing, the actuator, the pressure plate, the mounting plate, and the sensor switch have coaxial interior spaces to permit a cable to traverse through the robotic tool holder to a weld torch coupled to the actuator.

9. The robotic tool holder as defined in claim 1, wherein the springs exert a spring force on the pressure plate that is greater than a total of a first friction force between the pressure plate and the actuator along the line contact and a second friction force between ones of the dowels attached to the actuator and corresponding ones of the dowels attached to the housing.

10. The robotic tool holder as defined in claim 1, wherein the one or more sets of dowels comprises two or more sets of dowels spaced around an inner circumference of the housing and an outer circumference of the actuator.

11. The robotic tool holder as defined in claim 1, wherein the dowels comprise Stainless Steel Alloy 416 or titanium.

12. The robotic tool holder as defined in claim 1, wherein the plurality of springs are die springs, the mounting plate and the pressure plate comprising cavities to retain the plurality of springs.

13. The robotic tool holder as defined in claim 12, wherein the mounting plate and the pressure plate are configured to retain the plurality of springs parallel to a centerline of the housing.

14. The robotic tool holder as defined in claim 12, wherein the cavities in the pressure plate are tapered to reduce deflection of the plurality of springs when the pressure plate is tilted within the housing.

15. The robotic tool holder as defined in claim 1, wherein an end of the actuator that is in contact with the pressure plate has a curved surface around a circumference of the actuator such that the actuator and the pressure plate form a ball-and-socket-type joint.

16. The robotic tool holder as defined in claim 15, wherein the line contact changes with respect to the pressure plate when force is transferred by the actuator, and the actuator and the pressure plate are configured to tilt with respect to the housing based on a direction of the shock force.

17. The robotic tool holder as defined in claim 1, wherein an outer edge of the pressure plate is rounded to permit the pressure plate to rotate within the housing.

18. The robotic tool holder as defined in claim 1, wherein the one or more sets of dowels comprise three sets of dowels spaced around an outer circumference of the housing and an inner circumference of the actuator.

19. A robotic welding system capable of detecting impacts to a welding torch manipulated by a robot, the robotic welding system comprising:

a robot arm configured to move a welding end of the robot arm;

the welding torch;

a welding torch holder, comprising:
  a housing having a proximal end and a distal end;
  an actuator disposed within the housing and configured to hold the welding torch, the housing and the actuator being in contact via a plurality of dowels to limit movement of the actuator toward the distal end of the cylindrical housing, in which two or more of the plurality of dowels contact are in line contact and the two or more of the plurality of dowels that are in line contact are in a triangular geometry;
  a pressure plate in line contact with the actuator within the housing around a circumference of the pressure plate;
  a plurality of springs in contact with the pressure plate to bias the actuator toward the proximal end of the housing via the pressure plate;
  a mounting plate to couple the welding torch holder to the robot, the plurality of springs in contact with the mounting plate opposite the pressure plate; and
  a sensor switch to detect a shock force on the actuator and to output a signal in response to detecting the shock force; and a robot controller to receive the signal as an input and, in response to receiving the signal, to control the robot arm to assume a preset position.

20. A robotic tool holder, comprising:
a housing having a proximal end and a distal end;

an actuator disposed within the housing and configured to hold a tool, the housing and the actuator being in contact via a plurality of dowels to limit movement of the actuator toward the distal end of the housing, in which ones of the plurality of dowels that are in contact are in line contact and the ones of the plurality of dowels that are in contact are in a triangular geometry, wherein the plurality of dowels comprises one or more sets of dowels, each set of dowels comprising two dowels attached to the housing and one dowel attached to the actuator;

a pressure plate in line contact with the actuator within the housing around a circumference of the pressure plate;

a plurality of springs in contact with the pressure plate to bias the actuator toward the proximal end of the housing via the pressure plate;

a mounting plate to couple the robotic tool holder to a robot, the plurality of springs in contact with the mounting plate opposite the pressure plate; and a sensor switch to detect a shock force on the actuator and to output a signal in response to detecting the shock force.

\* \* \* \* \*